(12) United States Patent
Chen et al.

(10) Patent No.: US 8,427,727 B2
(45) Date of Patent: Apr. 23, 2013

(54) OSCILLATING MIRROR FOR IMAGE PROJECTION

(75) Inventors: Gang Chen, Westfield, NJ (US); Roland Ryf, Aberdeen, NJ (US); Maria Elina Simon, New Providence, NJ (US)

(73) Assignee: Alcatel Lucent, Paris (FR)

( * ) Notice: Subject to any disclaimer, the term of this patent is extended or adjusted under 35 U.S.C. 154(b) by 432 days.

(21) Appl. No.: 12/357,734

(22) Filed: Jan. 22, 2009

(65) Prior Publication Data

US 2009/0185251 A1 Jul. 23, 2009

Related U.S. Application Data

(63) Continuation-in-part of application No. 12/017,440, filed on Jan. 22, 2008, now Pat. No. 8,109,638.

(51) Int. Cl.
*G02B 26/08* (2006.01)
(52) U.S. Cl.
USPC ............... 359/224.1; 359/199.1; 359/199.3; 359/199.4; 359/200.7; 359/200.8
(58) Field of Classification Search .... 359/198.1–199.4, 359/200.6–200.8, 224.1–224.2; 353/37; 348/744, 759
See application file for complete search history.

(56) References Cited

U.S. PATENT DOCUMENTS

| | | |
|---|---|---|
| 4,155,630 A | 5/1979 | Ih |
| 5,506,597 A | 4/1996 | Thompson et al. |
| 6,317,169 B1 | 11/2001 | Smith |
| 6,323,984 B1 | 11/2001 | Trisnadi |
| 6,791,739 B2 | 9/2004 | Ramanujan et al. |
| 7,440,158 B2 | 10/2008 | Giles et al. |
| 2002/0149294 A1 | 10/2002 | Matsumoto et al. |
| 2004/0213515 A1 | 10/2004 | Pezeshki et al. |
| 2004/0239880 A1 | 12/2004 | Kapellner et al. |
| 2005/0231651 A1* | 10/2005 | Myers et al. .................. 348/744 |
| 2005/0253055 A1 | 11/2005 | Sprague et al. |
| 2006/0285078 A1 | 12/2006 | Kasazumi et al. |
| 2007/0041069 A1* | 2/2007 | Oettinger et al. ............. 359/214 |
| 2007/0046907 A1 | 3/2007 | Shin |
| 2007/0216982 A1* | 9/2007 | Sanders et al. ................ 359/201 |
| 2008/0212034 A1 | 9/2008 | Aksyuk et al. |
| 2008/0212040 A1 | 9/2008 | Aksyuk |
| 2008/0219303 A1 | 9/2008 | Chen et al. |

FOREIGN PATENT DOCUMENTS

| | | |
|---|---|---|
| EP | 1283434 A2 | 2/2003 |
| EP | 1734771 A1 | 12/2006 |
| KR | 20070057201 A | 6/2007 |
| WO | 2004064410 A1 | 7/2004 |
| WO | 2006035378 A1 | 4/2006 |
| WO | 2007022237 A2 | 2/2007 |
| WO | 2007072335 A2 | 6/2007 |

OTHER PUBLICATIONS

Related case, U.S. Appl. No. 12/017,440, to Gang Chen, et al., entitled "Diffuser Configuration for an Image Projector," filed on Jan. 22, 2008.

(Continued)

*Primary Examiner* — James Phan
(74) *Attorney, Agent, or Firm* — Hitt Gaines, PC

(57) ABSTRACT

An apparatus includes a substrate and a mirror. The mirror is attached to the substrate via a spring. An electro-mechanical driver is operable to cause the mirror to rotationally oscillate about first and second non-collinear axes at different first and second frequencies.

20 Claims, 14 Drawing Sheets

OTHER PUBLICATIONS

Related case, U.S. Appl. No. 12/009,991 to Gang Chen et al.; entitled "Multi Color Light Source"; filed on Jan. 22, 2008.

Related case, U.S. Appl. No. 12/009,851 to Gang Chen et al.; entitled "Time Division Multiplexing a DC-To-DC Voltage Converter"; filed on Jan. 22, 2008.

Related case, U.S. Appl. No. 12/017,984 to Gang Chen et al.; entitled "System and Method for Color-Compensating a Video Signal Having Reduced Computational Requirements"; filed on Jan. 22, 2008.

Related case, U.S. Appl. No. 12/357,835 to Gang Chen et al., entitled "A Light Modulator for Optical Image Projection" filed on Jan. 22, 2009.

J.W. Goodman, "Some Fundamental Properties of Speckle" Journal of the Optical Society of America, vol. 66, No. 11, pp. 1145-1150, Nov. 1976.

SC Kerigan, et al., "Perceived Speckle Reduction in Projection Display Systems" IP.com Journal, IP.com Inc., West Henrietta, NY, pp. 9-11, Jul. 1, 1997, XP-013106711.

"DC-DC Converted Basics" published on line at: http://www.powerdesigners.com/InfoWeb /design_center/articles/DC-DC/converter.shtm; 12 pages.

Greywall, Dennis S., et al.; "Crystalline Silicon Tilting Mirrors for Optical Cross-Connect Switches"; Journal of Microelectromechanical Systems, vol. 12, No. 5, Oct. 2003, pp. 708-712.

"S-334—Ultra-Long-Range Piezo Tip/Tilt Mirror"; Moving the NanoWorld, www.pi.we; 2 Pages.

PCT International Search Report dated May 4, 2009 for PCT/US2009/000413; 9 Pages.

* cited by examiner

OSCILLATING MIRROR FOR IMAGE PROJECTION

CROSS-REFERENCE TO RELATED APPLICATION

This is a continuation-in-part application of U.S. patent application Ser. No. 12/017,440, entitled, "DIFFUSER CONFIGURATION FOR AN IMAGE PROJECTOR," filed on Jan. 22, 2008, now U.S. Pat. No. 8,109,638, which is incorporated herein by reference in its entirety.

TECHNICAL FIELD

This application is directed, in general, to oscillating mirrors and apparatus and methods that use such mirrors.

BACKGROUND

This section introduces aspects that may help facilitate a better understanding of the inventions. Accordingly, the statements of this section are to be read in this light and are not to be understood as admissions about what is prior art or what is not prior art.

Small image projection systems may provide the potential to include projection capability in small portable electronic devices such as cell phones and PDAs. Some such systems may use laser light to create the image. But, the coherence of a light beam from a laser may lead to image artifacts that degrade image quality.

SUMMARY

One aspect provides an apparatus that includes a substrate and a mirror. The mirror is attached to the substrate via a spring. An electro-mechanical driver is operable to cause the mirror to rotationally oscillate about first and second non-collinear axes at different first and second frequencies.

Another aspect provides a method. The method includes illuminating a mirror with an incident light beam. The mirror is mechanically driven while performing the step of illuminating such that the mirror rotationally oscillates about a first axis with a first frequency and oscillates about a second non-collinear axis with a different second frequency.

BRIEF DESCRIPTION

The disclosure is best understood from the following detailed description when read with the accompanying Figures. Various features in the Figures are not necessarily drawn to scale. The dimensions of the various features may be increased or reduced for clarity of discussion. Coordinate axes appear in some figures to provide a reference for discussion purposes. Coordinate axes of one figure are not necessarily aligned with coordinate axes of another figure. Like reference numbers refer to similar elements throughout the Figures. Reference is now made to the following descriptions taken in conjunction with the accompanying drawings, in which:

DETAILED DESCRIPTION

Illuminating a viewing screen by a laser light beam typically causes some degree of speckle thereon. Herein, speckle refers to small image defects, e.g., pseudo-random spatial intensity patterns, that are produced by the interference of coherent light waves. Such interference can occur, e.g., in a light beam producing the image, at a screen on which the image is projected, or in light diffusely reflecting off such a screen. For example, speckle may be produced by interference of separate light waves produced by reflection off the roughness of a viewing surface. In an image projector using lasers to illuminate a spatial light modulator (SLM), speckle can introduce defects in the projected image that reduce the quality of the image to a human viewer.

In laser image projectors, speckle reduction can involve averaging two or more independent speckle configurations within a spatial region and/or temporal period that is below the resolution of a detector, such as the human eye. For the human eye, the averaging time can be deduced from a physiological parameter called the flicker fusion threshold or flicker fusion rate. More specifically, light that is pulsating at a rate lower than the flicker fusion rate is perceived by humans as flickering. In contrast, light that is pulsating at a rate higher than the flicker fusion rate is perceived as being constant in time. Flicker fusion rates vary from person to person and also depend on an individual's level of fatigue, the brightness of the light source, and the area of the retina that is being used to observe the light source. Nevertheless, very few people perceive flicker at a rate higher than about 75 per second ($s^{-1}$). Indeed, in cinema and television, frame delivery rates are between about 16 $s^{-1}$ and 60 $s^{-1}$, with 24-30 $s^{-1}$ normally being used. For the overwhelming majority of people, these frame delivery rates are higher than their flicker fusion rate.

The inventors have recognized that illuminating an SLM with light reflected from a planar, convex, or concave mirror driven to undergo vibratory rotations about two axes can generate multiple uncorrelated speckle patterns. In some embodiments, the eigenfrequencies of such vibrational modes of the mirror are selected to differ by greater than the flicker fusion rate of a typical human eye. Eigenfrequencies are defined and discussed below.

Figure 1:
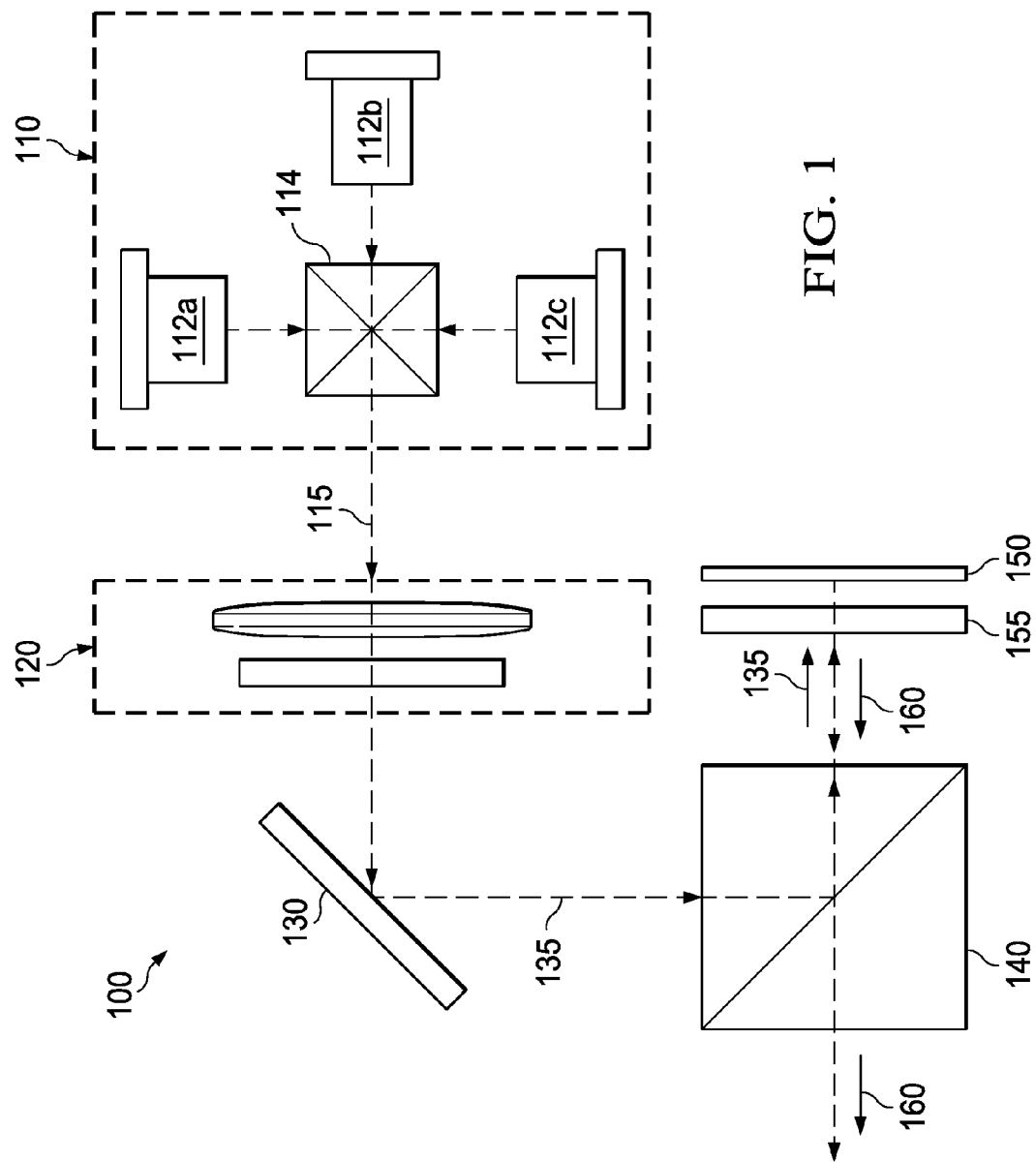
FIG. 1 illustrates image projection systems of the disclosure.

FIG. 1 illustrates an embodiment of an imaging system 100. Some elements of the imaging systems described herein and the methods of using said elements to produce projected images may be described in one or more of: U.S. Pat. No. 7,440,158; U.S. patent application Ser. Nos. 12/017,984, 12/017,440 (the '440 application), 12/009,991, and 12/009,851, which were all filed on Jan. 22, 2008; U.S. patent application Ser. Nos. 11/713,155, 11/681,376, and 11/713,483, which were all filed on Mar. 2, 2007; and U.S. patent application Ser. No. 12/357,835 entitled "A Light Modulator for Optical Image Projection" to Gang Chen, et al. filed on Jan. 22, 2009. The above-listed U.S. patent and the above-listed U.S. patent applications are incorporated herein by reference in their entirety.

The imaging system 100 includes an optical source 110, a diffusing/spreading optical lens system 120, a reflector 130, a polarization beam splitter (PBS) 140 and an SLM 150. In the illustrated embodiment, the optical source 110 includes coherent light sources 112a, 112b, 112c (referred to collectively as light sources 112), which may be, e.g., red, green and blue lasers, respectively. A color combiner (also known as an "x-cube") 114 may combine the outputs of the coherent light sources 112a, 112b, 112c to produce a single light beam 115. The light beam 115 passes through the diffusing/spreading optical lens system 120 to, e.g., increase the cross sectional area of the light beam 115 and to collimate the resulting light beam. The light beam 115 then reflects from the reflector 130 with a reflected light beam 135. The PBS 140 directs the reflected light beam 135 to illuminate the SLM 150. The SLM 150 may be, e.g., a planar array of liquid-crystal pixels, e.g., liquid-crystals-on-silicon (LCoS), or a MEMS-operated micro-mirror array. The SLM 150 may be configured as, e.g., a spatial amplitude modulator.

In the illustrated embodiment, the reflected light beam 135 passes through a compensating waveplate 155 used, e.g., to enhance contrast of a projected image. When the SLM 150 is an LCoS device, e.g., an individual pixel thereof can be activated or non-activated to cause the light to be reflected from that pixel with the opposite or same polarization state, respectively, as the reflected light beam 135. Depending upon the configuration of the system 100, one of vertical or horizontal polarized light reflects off the pixel and through the PBS 140 to projection optics (not shown) and thereby provides a bright-field pixel of a projected image. The other of horizontal or vertical polarized light passes through the PBS 140 in the direction orthogonal to the projection optics and thereby provides a dark-field pixel of the image. The pixels of the SLM 150 configured to form image pixels collectively produce an output light beam 160. The output light beam 160 may be further manipulated by a spatial filter (not shown) to form the light beam that produces a projected image.

To reduce the perception of image artifacts produced by laser speckling, spatial phase and/or intensity correlations of the off-axis components of the light beam may be reduced. One technique for reducing such correlations is disclosed in the '440 application. In that technique, a reflector at the location of the reflector 130 includes a planar, convex, or concave mirror mounted on a shaft. The shaft is fixed to the surface of the mirror at a small angle with respect to the normal to the surface. The shaft is configured to rotate causing the surface of the mirror to undergo a wobbling motion so that the direction of light that is reflected from the mirror varies slightly with time, e.g., thereby causing such reflected light to become less temporally correlated. The rotation rate of the shaft may be greater than the flicker fusion rate of a viewer.

While the method described in the '440 application reduces perceived speckling, the electromechanical complexity and cost of such spinning devices, e.g., may be undesirable. Thus, another mirror for reducing temporal or spatial correlations of speckles is needed.

Figure 2:
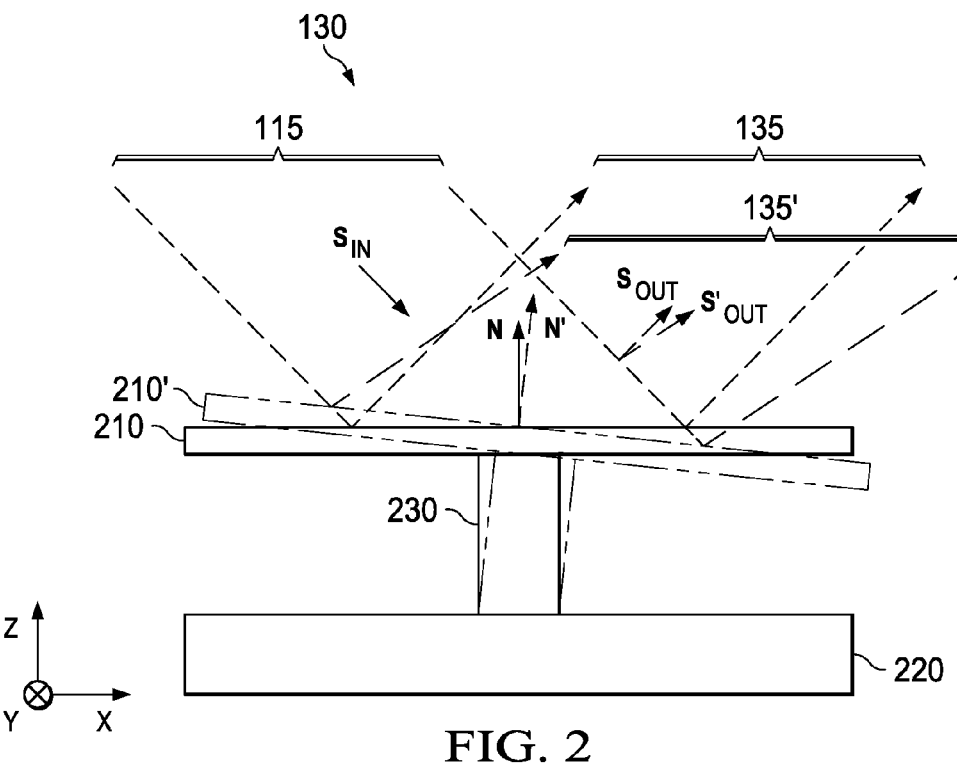
FIG. 2 illustrates a reflector, e.g., usable in the image projection system of FIG. 1.

FIG. 2 illustrates the reflector 130 and also shows x, y, and z coordinate axes for reference. In the reflector 130, a planar, convex, or concave mirror 210 is attached to a substrate 220 by a spring 230. The mirror 210 includes a highly reflective surface. In some embodiments, the mirror 210 includes a metal plate formed to have a highly reflective surface. For example, the mirror 210 may be formed from a polished metal plate, or a layer of, e.g., silver or aluminum may be deposited by conventional means onto a polished metal substrate. In some embodiments, the mirror 210 includes a smooth reflective metal layer, e.g., Al, deposited by conventional means onto a planar glass or semiconductor substrate such as Si. In some embodiments, the glass or silicon substrate may be about 0.5 mm or more thick to provide sufficient stiffness to avoid excessive deformation under the stresses produced by the mechanical actuation methods described below. In other embodiments, the mirror 210 includes a dielectric mirror. Those skilled in the pertinent art understand that a dielectric mirror includes a number of dielectric layers of different refractive index, e.g., alternating index, to provide high reflectivity, e.g., as a Bragg reflector, over a narrow range of wavelengths. The dielectric mirror may be formed on, e.g., a glass or silicon substrate by conventional deposition techniques.

The mirror 210 has a surface normal N associated therewith. In an undeflected state of the mirror 210 (also referred to an equilibrium or rest position), the light beam 115 is reflected from the mirror 210 to form the reflected light beam 135. The direction of light beams 115, 135 may be represented by, e.g., Poynting vectors $S_{in}$ and $S_{out}$, respectively. In a deflected state (also referred to as a nonequilibrium position), the mirror, designated 210', has a surface normal N' associated therewith. The deflection of the mirror is due to the driving forces applied in the x-y plane as described in detail below. A reflected light beam 135' has a direction represented by a Poynting vector $S'_{out}$. The driving forces vary with time, so the direction of $S'_{out}$ also varies with time.

FIG. 2 illustrates the case in which the tilting of the mirror 210 is due to rotation of the mirror 210 about the y-axis. The surface normal N thus rotates in the x-z plane of the illustrated reference frame. The mirror 210 may also be rotated about the x-axis to cause the N to rotate in the y-z plane. Thus, the mirror 210 can be tilted about two non-collinear axes in response to the driving forces of the mirror 210. The tilting causes the direction of $S'_{out}$ to vary in time in two dimensions.

Figure 3A:
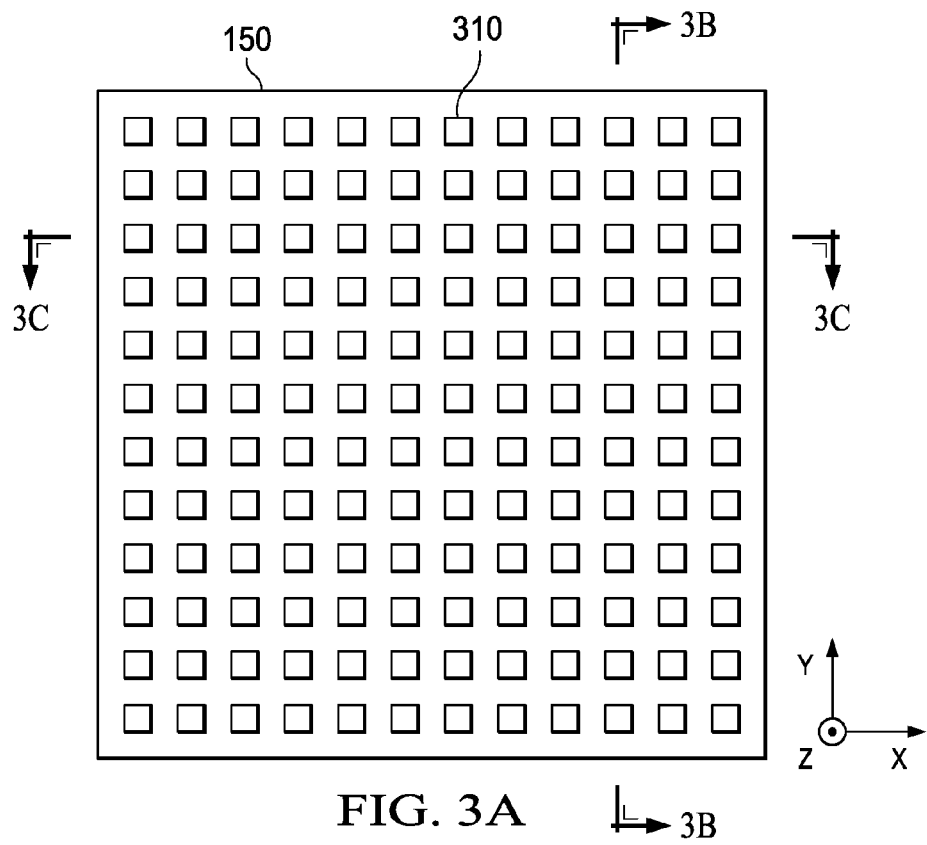
FIGS. 3A-3C illustrate a light beam illuminating a spatial light modulator (SLM), e.g., an SLM of the system of FIG. 1.
Figure 3B:
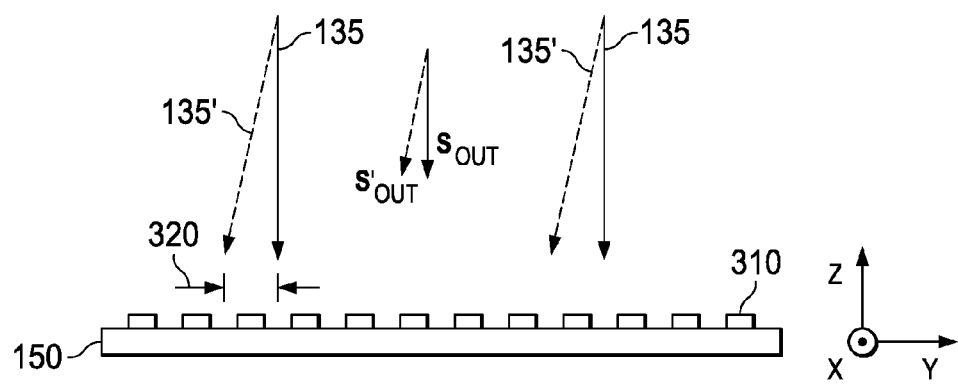
Figure 3C:
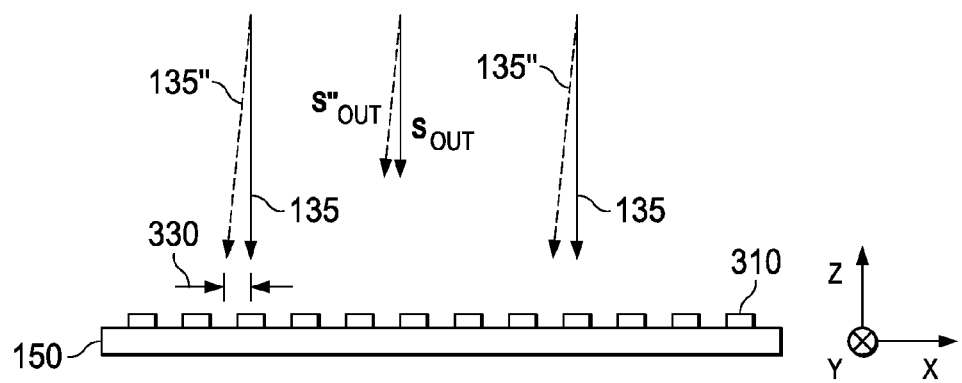

FIG. 3A illustrates a plan view, and FIGS. 3B and 3C illustrate sectional views of an example of the SLM 150 when illuminated by the light beam 135 (including the light beam 135'). Here, the x, y, and z coordinate axes may be oriented differently than the x, y, and z coordinate axes of FIG. 2. In the illustrated embodiment, the SLM 150 has a regular two-dimensional array of pixels 310 thereon. The pixels 310 may be controlled to reflect with a desired lateral pattern of amplitudes thereon thereby producing, e.g., a light beam for one frame of an image with a desired color. A multi-color image may be formed by temporally interleaving a sequence of monochromatic frames with a selected sequence of colors, e.g., red, green and blue.

FIGS. 3B and 3C illustrate the reflected light beams 135, 135'. The reflected light moves dynamically in a range represented by the difference $S'_{out}-S_{out}$, thus sweeping across the surface of the SLM 150 as the mirror 210 rotates about two non-collinear axes. The orientation of $S'_{out}$ may vary within, e.g., a cone determined by the maximum rotation of the mirror 210 about the x and y axes. In FIG. 3B the light beam 135 sweeps a distance 320 across the surface in the y-direction, as the mirror 210 deflects from its rest position to its deflection limit about the y axis of FIG. 2. In FIG. 3C the beam 135 sweeps a distance 330 across the surface in the x-direction, as the mirror 210 deflects from its rest position to its deflection limit about the x axis of FIG. 2. The distance 320 may be, but is not necessarily, equal to the distance 330. When the mirror 210 simultaneously rotates about two non-collinear axes, the light beam 135 sweeps across the SLM in two dimensions. In some embodiments of the system 100, the pixels 310 have a pitch of about 5 μm. In some embodiments, a 1° change of the direction of the reflected light 135 results in the sweep distances 320, 330 being about 200 μm, or about 40 pixels. It is believed that spreading the reflected light 135 in the described manner advantageously reduces the spatial and/or temporal correlation of speckles, resulting in improved quality of the projected image. In other embodiments, the sweep distance is greater than or less than 200 μm due to, e.g., differences in the configuration of elements of the system 100.

As described further below, the beam 135 sweeps across the SLM 150 in an oscillatory manner in the x and y directions. The oscillation occurs at a frequency that exceeds that of the flicker fusion rate of a typical viewer. In some embodiments, the oscillation in the x and y axes may have a frequency in the range of 100 Hz to 1 kHz.

Figure 4A:
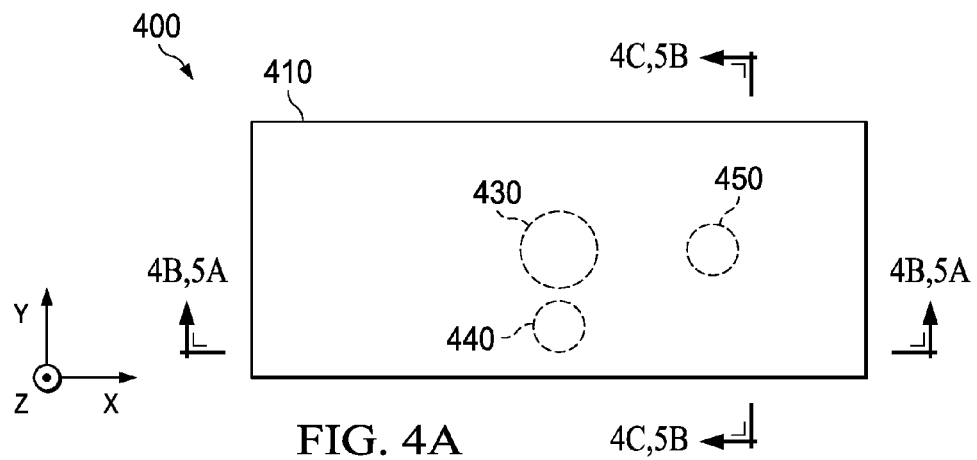
FIGS. 4A-4C, illustrate a mirror and actuators, e.g., usable in the image projection system of FIG. 1.
Figure 4B:
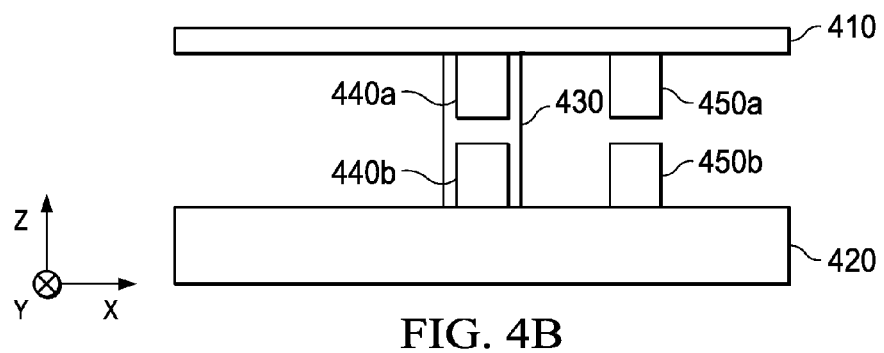
Figure 4C:
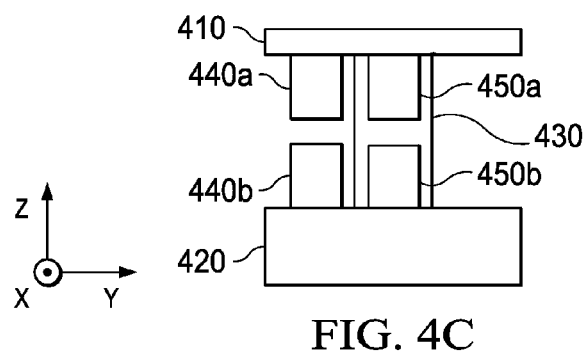

Turning to FIGS. 4A through 4C, illustrated is an embodiment of a mechanically driven reflector designated 400. FIG. 4A is a plan view, and FIGS. 4B and 4C are sectional views of the reflector 400. A back surface of the planar, convex, or concave mirror 410 is attached to a substrate 420 by a spring 430. Actuators 440, 450 are configured to apply torques to the mirror 410, as described further below. The torque on the mirror is transferred to the spring 430, which elastically bends and provides a restoring force to the mirror 410. The spring 430 may have, e.g., the form of any of a bending beam spring, a coil spring, and a torsion spring. The mirror 410 is typically formed with sufficient stiffness to not deform significantly under the torque applied by the electro-mechanical actuators 440, 450.

The actuators 440, 450 produce forces on the mirror 410 and due to their off-center positions produce torques that cause the mirror 410 to rotate from an equilibrium orientation. The actuators 440, 450 may be electromechanical drivers and may provide attractive or repulsive forces. The forces may be produced by, e.g., capacitors, electro-magnets, or piezoelectric components that change their length in an applied electrical field.

In a non-limiting example, the actuators 440, 450 include vertically facing magnetic components that may be operated to attract or repel each other. More specifically, the actuator 440 may include actuator components 440a, 440b such as, e.g., a permanent magnet 440a, and an electromagnet 440b. The actuators 440, 450 are operable to cause the mirror 410 to rotationally oscillate about first and second non-collinear axes at different first and second frequencies. The force between the permanent magnet 440a and the electromagnet 440b is expected to be about proportional to the dot product of the magnetic moment M of the permanent magnet 440a and the magnetic field B of the electromagnet 440b. The permanent magnet 440a may be located between the mirror 410 and the substrate 420, as illustrated, or over the mirror 410. In various embodiments, the permanent magnet includes a material capable of maintaining a strong magnetic dipole, e.g., a rare earth magnetic material such as $Nd_2Fe_{14}B$, $SmCo_5$ or $Sm_2Co_{17}$. Such magnets may be bonded to the mirror 410 with a conventional adhesive.

In embodiments in which the component dimensions of the mirror 410 are small, e.g., linear mirror dimensions <1 mm, micromachining techniques known to those skilled in the pertinent arts may be used to form the mirror 410, spring 430 and actuators 440, 450. Such techniques may include, e.g., lithographic patterning and etching, CVD and sputtering of materials, and release of movable components by removing sacrificial attachment layers by, e.g., wet-etching. Some magnetic materials, e.g., permalloy (Ni/Fe) may be deposited, patterned, and etched using conventional techniques.

When commanded by a control current from a controller (not shown), the electromagnet 440b may be magnetized, thereby creating an attractive or repulsive force, in the z-direction, with respect to the permanent pole magnet 440a. The force causes a torque that rotates the mirror 410 about the x axis in the indicated reference frame. The actuator 440 may similarly include a permanent magnet 450a and an electromagnet 450b. When the actuator 450 is energized, the mirror 410 rotates about the y axis due to the torque applied by the actuator 450.

The actuators 440 and/or 450 may be driven by an alternating current (AC) source. For example, the AC source may be connected across a capacitor in the actuator 440 or the actuator 450. The mirror 410 rotationally oscillates resonantly or non-resonantly, i.e., depending on the driving frequencies. In some embodiments, the AC source may provide a continuously varying alternating current to the actuators 440, 450. In other embodiments, the AC source provides periodic quasi-digital impulses. In the case of resonant oscillation, the mirror 410, spring 430 and any actuator components attached to the mirror 410 form a mechanical filter. The rigid moving components (e.g., mirror 410 and attached actuator components) have a moment of inertia associated therewith, the actuators 440, 450 provide a force and associated torque, and the spring 430 provides a restoring force and torque. The filter has a Q value associated therewith. When Q is large enough, e.g., >10, the motion of the mirror may be made to resonate if the AC force applied by either of the actuators 440, 450 is applied at a resonant frequency. As a filter, the rigid mirror 410 strongly damps mechanical rotations at frequencies other than the resonant frequencies. In some cases, this ability to damp non-resonant driving motions may simplify some system designs.

In some embodiments, the rotational oscillation of the mirror 410 is non-resonant, because the AC driving forces have frequencies far from a resonant frequency. In some cases, resonant frequency may not exist, or a Q of the moving assembly may be too low (highly damped) to provide for clear resonances. In non-resonant embodiments, the orientation of the mirror 410 may be set to a value commanded by a controller (not shown). The controller may also provide a signal configured to rotate the mirror 410 about the x and y axes, e.g., in a coordinated manner that results in a desired oscillatory rotation about an axis. Such a controller in general requires separate channels that independently control of the oscillatory rotations about non-parallel axes and also controls the relative phases of the rotations about the two axes.

Figure 5A:
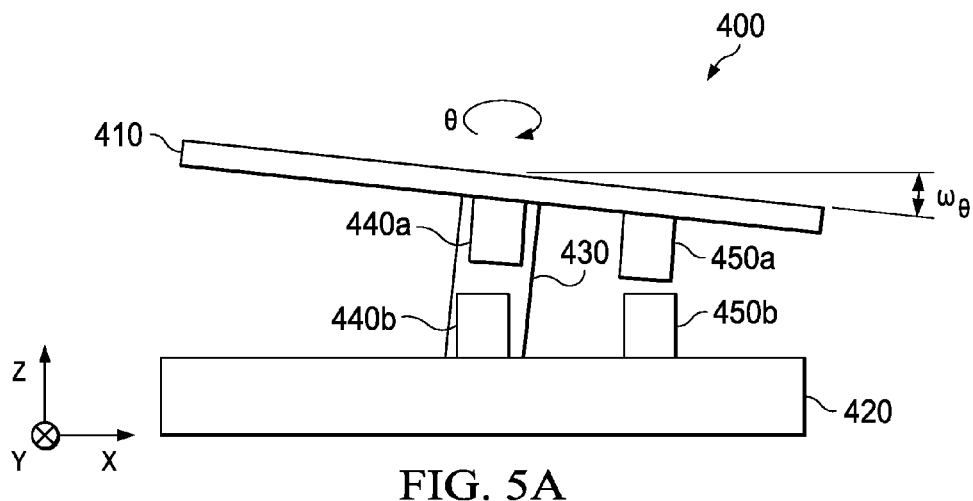
FIGS. 5A and 5B illustrate rotation of the mirror of FIG. 4 about non-collinear axes.
Figure 5B:
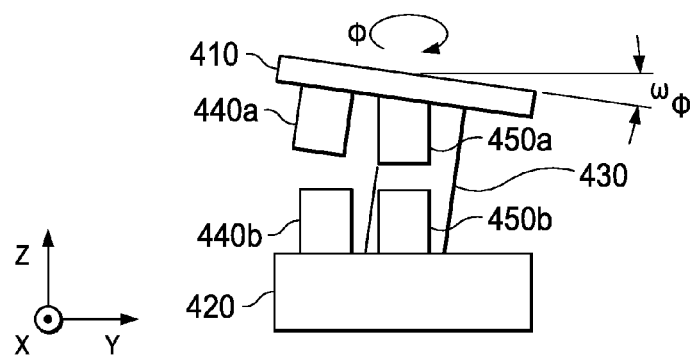

FIGS. 5A and 5B illustrate the reflector 400 in a deflected configuration. FIG. 5A corresponds to FIG. 4B, and FIG. 5B corresponds to FIG. 4C. The actuator components 450a, 450b in combination with the mirror 410 and the spring 430 may have a mechanical resonant frequency $\omega_\theta$ associated with the rotational oscillations about the y axis. The frequency $\omega_\theta$ is expected to depend primarily on the mass of the mirror 410, the length of the mirror in the x direction, and the restoring force provided by the spring 430 rotating the mirror 410 about the y axis. In the case that the actuator 440 includes an electromagnet, e.g., the electromagnet may be driven at a frequency of about $\omega_\theta$ to excite the resonant mode at the frequency $\omega_\theta$.

Similarly, the mirror 410 may have a mechanical resonant frequency $\omega_\phi$ associated with the rotational oscillations about the x axis. The frequency $\omega_\phi$ is expected to depend on the mass of the mirror 410, the length of the mirror in the y direction, and the restoring force provided by the spring 430 rotating the mirror 410 about the x axis. The restoring force about the x axis is not necessarily equal to the restoring force about the y axis. For the case that the actuator 450 includes an electromagnet, e.g., the electromagnet may be energized at a frequency of about $\omega_\phi$ to excite the resonant mode at the frequency $\omega_\phi$. Thus, the mirror 410 may have a first resonant oscillation frequency (eigenfrequency) for rotations about the x axis and has a different second resonant oscillation frequency (eigenfrequency) for rotations about the y axis.

The reflector 400 may be operated such that both the $\omega_\theta$ and $\omega_\phi$ resonant modes are excited simultaneously. When operated in this manner, the light beam reflected from the mirror 410 may sweep out a complex path in time, e.g., a Lissajous figure. Such operation may advantageously temporally average out spatial correlations that cause speckle.

In an example embodiment, the mirror 410 is formed with a length of about 8 mm and a width of about 5 mm. The spring 430 is formed using a coil spring with a diameter of about 1 mm and a length of about 2 mm. This configuration may result in resonant frequencies $\omega_\theta$ and $\omega_\phi$ between about 200 s$^{-1}$ and about 300 s$^{-1}$. In other embodiments, the length of the mirror sides may be, e.g., on the order of one centimeter. It is thought that larger mirrors (>1-2 mm) are generally best actuated by electromagnets, as electrostatic actuators generally require closer spacing between actuator components, e.g., capacitor plates, than do electromagnets, thereby limiting the range of the rotational oscillations of the mirror 410. Mirrors about 1 mm or smaller may be driven by magnetic or electrostatic drivers, though in some cases, e.g., electrostatic drivers may be easier to fabricate using known techniques for these small dimensions.

Figure 6:
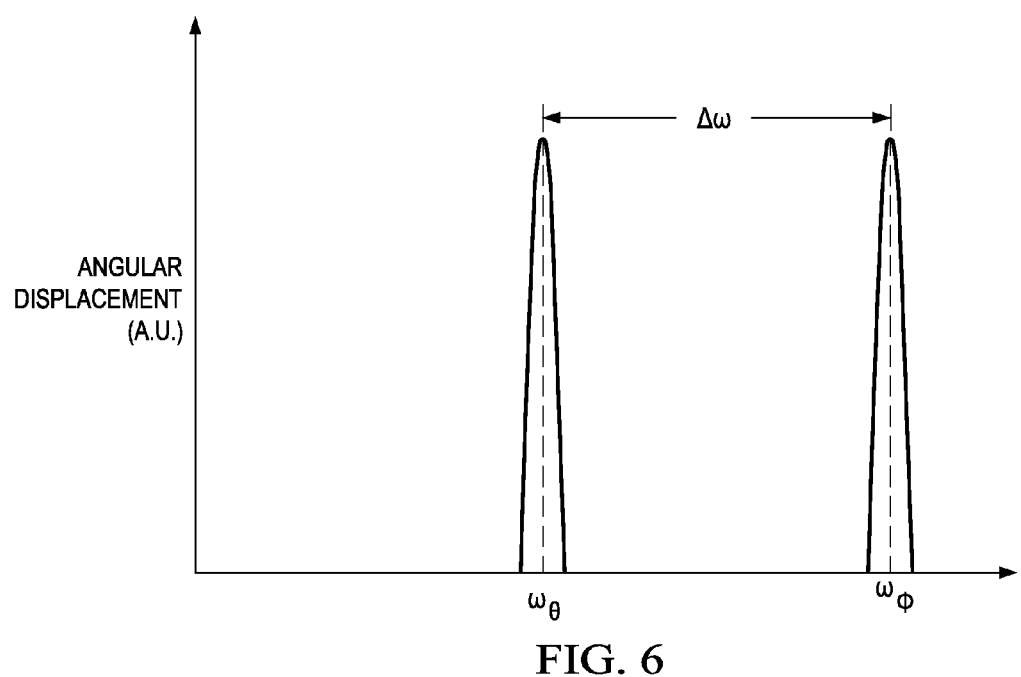
FIG. 6 illustrates eigenfrequencies of an oscillating mirror, e.g., the mirror of FIG. 2.

FIG. 6 qualitatively illustrates a magnitude of the amplitude of the angular displacement (in arbitrary units) of the mirror 410 as a function of the driving frequency. In the illustrated embodiment where the mirror 410 is not rotationally symmetric, there may be two peak amplitudes at the resonant driving frequencies $\omega_\theta$ and $\omega_\phi$. The frequencies $\omega_\theta$ and $\omega_\phi$ of the peak amplitudes are referred to herein as eigenfrequencies of the mirror driving force or torque. The eigenfrequencies are associated with resonant oscillations of the mirror 410 about its two driving axes. The resonant modes may be fundamental modes or harmonics of fundamental modes.

When the reflector 400 is driven at both of the $\omega_\phi$ and $\omega_\theta$ eigenfrequencies simultaneously, a beat frequency $\Delta\omega$ equal to the magnitude of $\omega_\phi - \omega_\theta$ may result. When $\Delta\omega$ is less than the flicker fusion rate of a viewer, motion of the speckle peaks may be perceived by some viewers. In some embodiments, therefore, the eigenfrequencies are selected to result in a beat frequency that is greater than the flicker fusion rate of the human eye, e.g., about 16 s$^{-1}$. In this manner, perception of lateral motion and/or deformation of the speckle peaks caused by the resonant mechanical driving of the mirror 410 is expected to be substantially reduced.

Returning to FIG. 4, the reflector 400 may be non-rotationally symmetric about a normal vector at the center of its reflecting surface. In such a configuration the mirror 410, and mechanical components attached thereto, may cause there to be two different eigenfrequencies for driving the mirror 410 to rotationally oscillate about two different non-collinear axes. If the mirror 410 is rectangular, as illustrated, and the spring 430 provides a symmetric force along the rotational axes of the mirror 410, e.g., a spring 430 with circular cross section, the mirror 410 will have a first eigenfrequency associated with rotational oscillations about the x axis (the long axis of the mirror 410) and will have a different second eigenfrequency associated with rotational oscillations about the y axis (the short axis of the mirror 410).

Other variations of the mechanical characteristics of the reflector 400 may also result in two different eigenfrequencies when AC driving the mirror 410 to perform rotational oscillations about non-collinear axes. In some embodiments, the spring 430 may be formed to produce a different restoring force for rotational oscillations about different rotational axis. Such a spring may be formed with, e.g., a rectangular cross-section or with a material component having axially non-symmetric mechanical properties.

The actuators 440, 450 may be attached to the mirror 410 and the substrate 420 by conventional techniques, e.g., adhesive or solder. Other aspects of the actuator configuration generally depend on the type of actuator employed. For example, a permanent magnet needs only to be mechanically attached to the mirror 410 or the substrate 420. An electromagnet, however, also requires electrical connections to energize the magnet. Similarly, both plates of a capacitive actuator require an electrical connection to enable application of a voltage between the plates. Thus, a current path may be provided, e.g., within the substrate 420 and/or the spring 430 to one or both of the actuator components 440b, 450b.

In some embodiments, the actuators 440, 450 may provide an attractive or repulsive electrostatic force. Thus, e.g., a controller may apply static and/or periodically alternating voltages to actuator components 440a, 450a to produce static and/or alternating electrical potential there between. In some embodiments, the actuator components 440a, 450a are eliminated, and the mirror 410 serves directly as one capacitor plate of the actuators 440, 450.

Figure 7A:
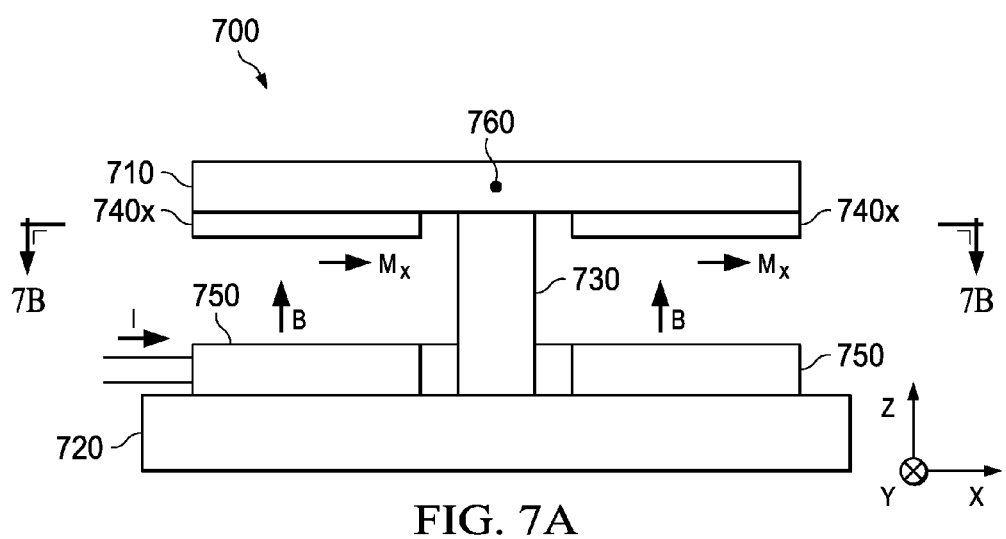
FIGS. 7A-7C, illustrate an alternate embodiment of a reflector usable, e.g., in the image projection system of FIG. 1.
Figure 7B:
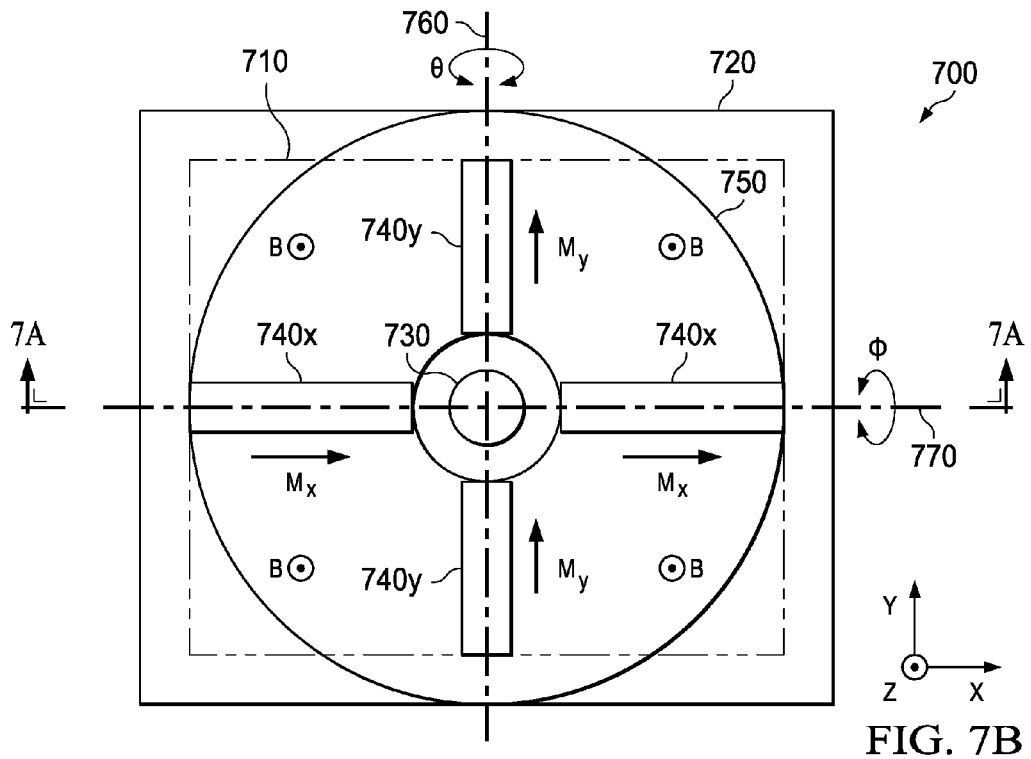
Figure 7C:
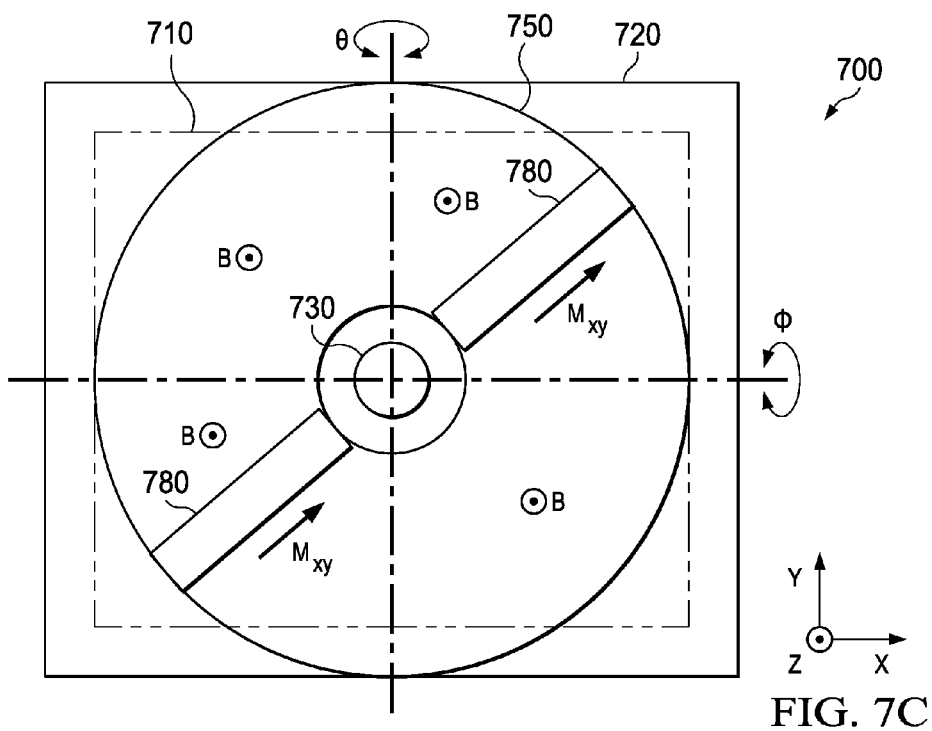

FIGS. 7A, 7B and 7C illustrate an embodiment of a reflector 700. FIG. 7A is a sectional view of the reflector 700. A planar, convex, or concave mirror 710 is attached to a substrate 720 by a spring 730. Magnets 740x are rigidly attached to the mirror 710. A coil 750 is located on the substrate 720. The coil 750 may be energized with a current I to produce a magnetic field B along the z axis of the coordinate reference frame. The field B is expected to produce a torque of about $M_x \times B$ that deflects the mirror 710 by an angle $\theta$ about an axis 760 of rotation that is parallel to the y axis of the coordinate reference frame (FIG. 7B).

FIG. 7B is a plan view through the magnets 740x. In the illustrated embodiment, magnets 740y are rigidly attached to the mirror 710 and oriented parallel to the y axis (normal to magnets 740x). The field B is expected to produce a torque $M_y \times B$ that will deflect the mirror 710 by an angle $\phi$ about an axis of rotation 770 that is parallel to the x axis of the coordinate reference frame.

Figure 8A:
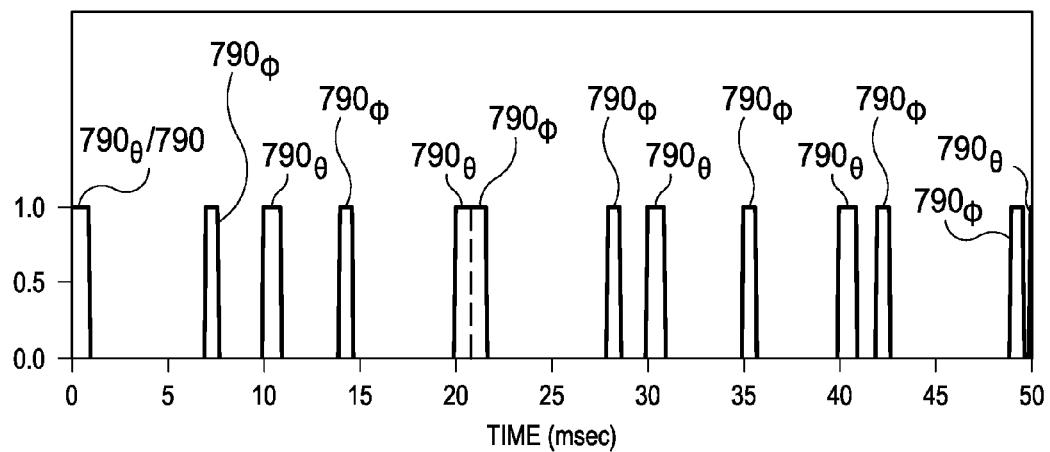
FIGS. 8A-8C illustrate the oscillatory excitation of a mirror to rotate about two axes, e.g., the mirror of FIG. 2 in the system of FIG. 1.
Figure 8B:
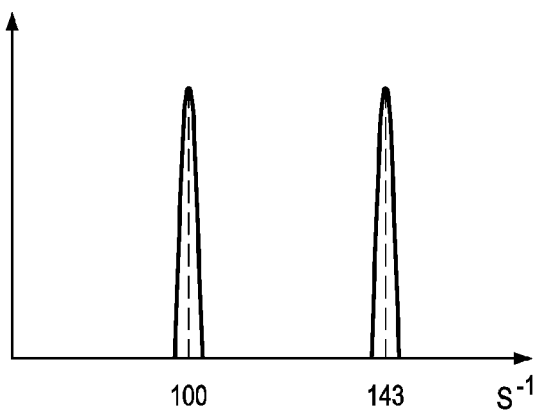

Turning to FIG. 8A, illustrated is a nonlimiting example of a time-domain presentation of an AC source for driving the electro-magnet(s) to produce the B field of FIGS. 7A, 7B, 7C to excite two resonant frequencies of the planar, convex, or concave mirror 710. FIG. 8B presents a frequency-domain representation of the AC source. A first eigenfrequency $\omega_\theta$ has a period of about 10 ms (100 s$^{-1}$). The pulses of the train with the period $1/\omega_\theta$ are designated 790$_\theta$. A second eigenfrequency $\omega_\phi$ has a period of about 7 ms (143 s$^{-1}$). The pulses of the train with the period $1/\omega_\phi$ are designated 790$_\phi$. When the mirror 710 and magnets 740$x$, 740$y$ are configured such that the mirror 710 has resonant frequencies at $\omega_\theta$ and $\omega_\phi$, the mirror 710 will resonantly rotationally vibrate (i.e., wobble) about the x and y axes at these frequencies.

Figure 8C:
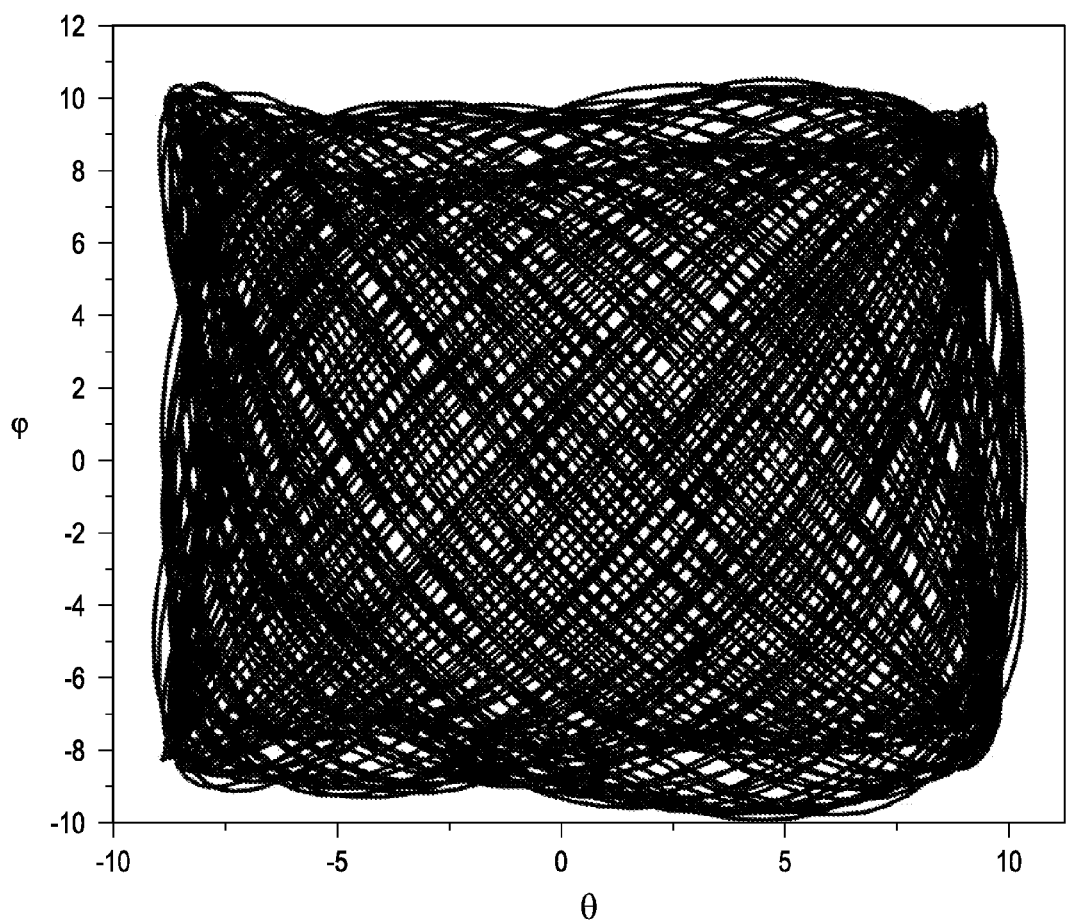

FIG. 8C illustrates a trace of the $\phi$ and $\theta$ values temporally swept out during the deflection of one example of the mirror 710, which is driven in one exemplary way. This trace illustrates that the coverage of the parameter space may be dense. In various embodiments, one expects to obtain traces that are similar to Lissajous curves, e.g., dense Lissajous curves when a mirror and/or its restoring spring is not axially symmetric. For traces with dense coverage as in FIG. 8C, a coherent light beam reflecting from the mirror 710 is expected to be uniformly reoriented within the deflection limits of the mirror 710 thereby reducing the perception of the speckles by an observer.

It is generally preferred that $\omega_\theta$ and $\omega_\phi$ are selected such that these frequencies are not related by, e.g., a small integer multiple. For example, where $\omega_\theta = \omega_\phi$, the trace of the $\phi$ and $\theta$ in FIG. 8C may be, e.g., a circle or ellipse. While the spatial and/or temporal correlation of speckles may be advantageously reduced in such a case, it is expected that greater benefit results when the trace of $\phi$ and $\theta$ is more uniformly distributed in the $\phi$, $\theta$ parameter space as illustrated in the example of FIG. 8C.

Turning back to FIG. 7C, illustrated is an alternate embodiment of the reflector 700. In this embodiment, the magnets 740$x$, 740$y$ are replaced by magnets 780 with a magnetic moment $M_{xy}$ oriented nonparallel to the axes of rotation 760, 770. When configured as illustrated, the magnetic field B is expected to produce a torque having components in both the x and y axes. When the B field is configured to include the eigenfrequencies of resonant modes of the x and y axes, the mirror 710 is expected to behave similarly to the case illustrated by FIG. 8B, e.g. When the Q value of the moving assembly is greater than about 10, e.g., the assembly may effectively damp motion at frequencies other than the resonant frequencies. Thus, a single electromagnet, e.g., may be used to excite both resonant frequencies without producing undesired vibrations at other frequencies.

In general, the resonant frequencies of the mirror 710 are expected to be different in the configuration of FIG. 7C compared to FIG. 7B due to, e.g., a different distribution of mass of the mirror/magnet assembly. That is, the mirror and rigidly attached assemblies have different moments of inertia about the non-parallel rotational axes about which the mirror is being driven. Those skilled in the pertinent art will recognize that other configurations of the magnets 780 may be used to result in excitation of both resonant modes of the mirror 710.

Figure 9A:
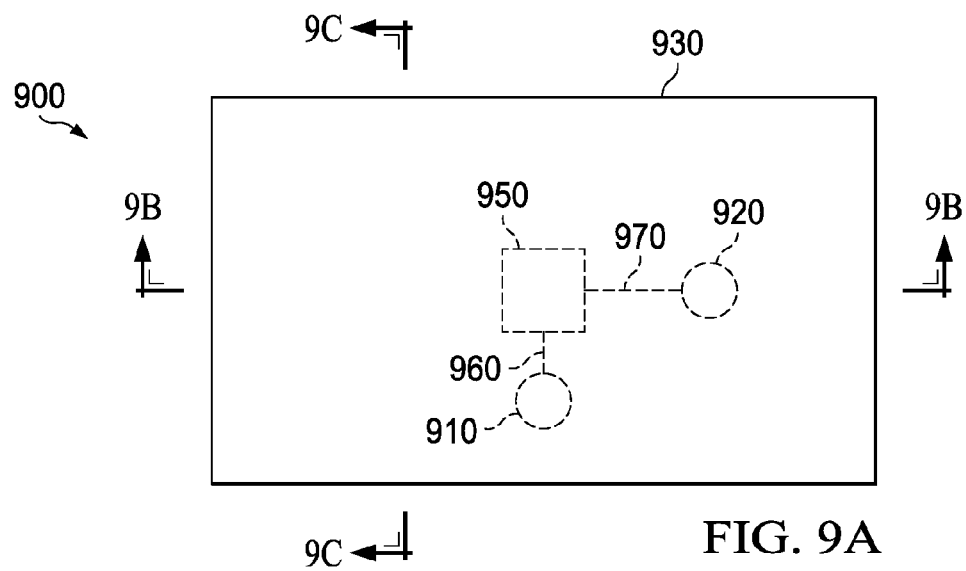
FIGS. 9A-9C illustrate an embodiment of a reflector usable, e.g. in the system of FIG. 1, in which power is provided to an actuator element mounted to the mirror.
Figure 9B:
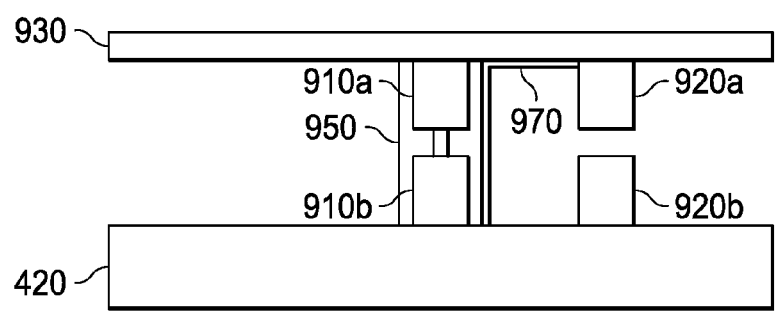
Figure 9C:
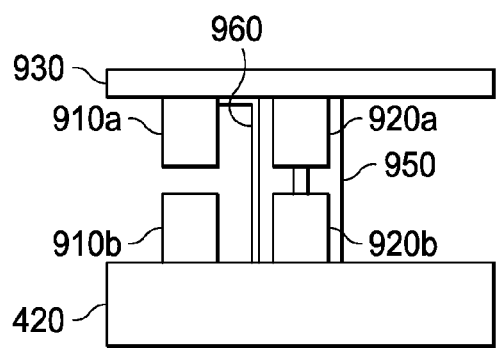

In another example embodiment, FIG. 9 illustrates a reflector 900 for which power is provided to electromagnet actuator components. An actuator 910 includes two actuator components 910$a$, 910$b$, that may be, e.g., electromagnets 910$a$, 910$b$. An actuator 920 includes two actuator components 920$a$, 920$b$ that may be, e.g., electromagnets 920$a$, 920$b$. A planar, convex, or concave mirror 930 is supported above the substrate 420 with a spring 950. Power to the electromagnets 910$a$, 920$a$ may be provided via respective conductors 960, 970. In some embodiments, the conductors 960, 970 are attached to the spring 950 and the mirror 930 to provide an AC control signal from a controller (not shown). In other embodiments, the spring 950 provides conductive paths therethrough connected to the conductors 960, 970. The electromagnets 910$b$, 920$b$ may be powered via conductors (not shown) attached to or embedded within the substrate 420.

The electromagnets 910$a$, 910$b$, 920$a$, 920$b$ do not typically have a permanent magnetic dipole associated therewith. Thus, when unenergized the electromagnets 910$a$, 910$b$, 920$a$, 920$b$ are expected to have no significant interaction with a magnetic field from a source external to the reflector 900. Thus, the external field is expected to cause less perturbation of the position of the mirror 930 than embodiments employing permanent magnets.

Figure 10:
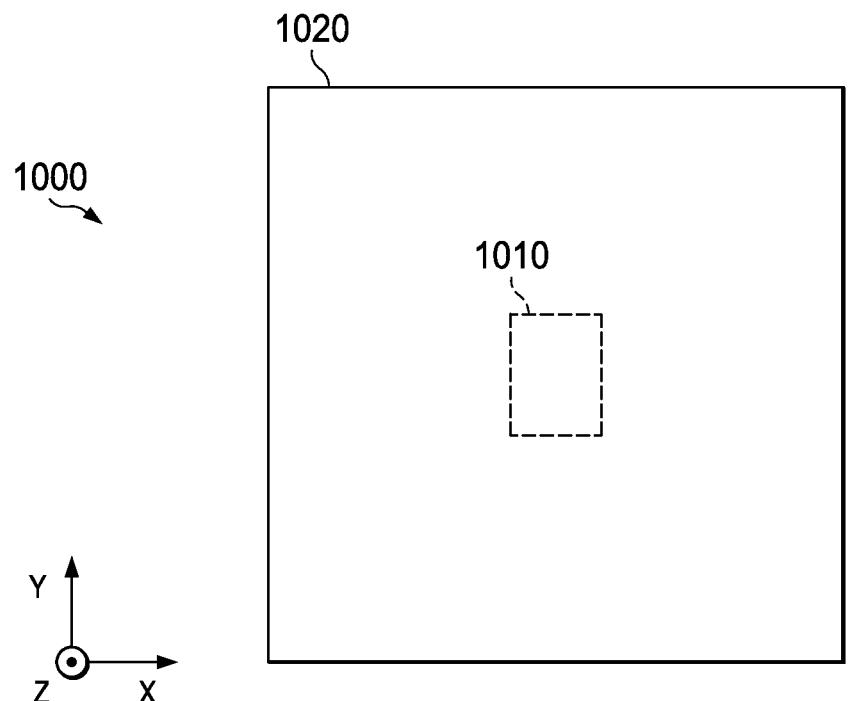
FIG. 10 illustrates an embodiment of a reflector usable, e.g. in the system of FIG. 1, in which a spring applies an axially asymmetric restoring force.

Turning now to FIG. 10, illustrated is an embodiment of a planar, convex or concave reflector, generally designated 1000. The reflector 1000 includes a spring 1010 that has a different restoring force in the x and y directions. Actuators are present but not shown. Without limitation, the spring 1010 is shown as having a rectangular cross-section. Because the spring 1010 applies an axially asymmetric restoring force, a planar, convex, or concave mirror 1020 may be axially symmetric and still have two different eigenfrequencies for rotational oscillations about the x and y axes. Such a configuration may be desirable in cases in which the light beam 115 has a square or circular cross-section, e.g. In the illustrated embodiment, the spring 1010 is expected to be stiffer in the y direction than in the x direction. Thus, the reflector 1000 will have a higher eigenfrequency associated with rotational oscillations around the y direction than around the x direction. As described previously, the spring 1010 may be configured such that the magnitude of the difference between the eigenfrequencies associated with the two resonant rotational oscillation modes is greater than the flicker fusion rate.

Figure 11:
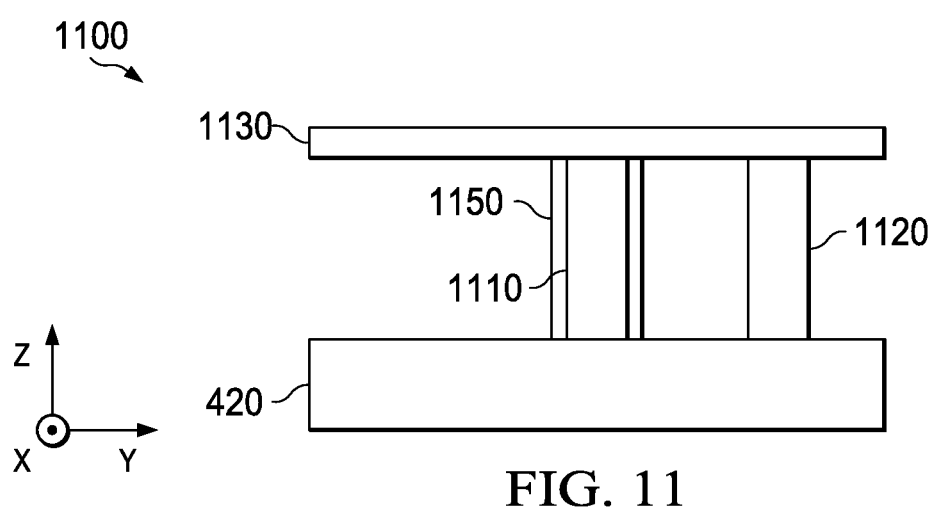
FIG. 11 illustrates an embodiment of a reflector usable, e.g. in the system of FIG. 1, using piezoelectric elements.

FIG. 11 illustrates an embodiment of a reflector 1100 in which actuators 1110, 1120 are piezoelectric elements. A planar, convex, or concave mirror 1130 is attached to the substrate 420 by a spring 1150. The actuators 1110, 1120 may be conventional piezoelectric elements, and may be controlled by methods known to those skilled in the art. The actuators 1110, 1120 may be controlled by a controller (not shown) to cause the mirror 1130 to resonantly perform rotational oscillations around two non-collinear directions with different eigenfrequencies, as described above with respect to the reflector 400.

In this embodiment, it is expected that eigenfrequencies of the mirror 1130 will depend, in addition to the previously described factors, on mechanical characteristics of the piezoelectric actuators 1110, 1120. Thus, the eigenfrequencies of the reflector 1100 are not in general expected to be the same as those of the reflector 400, though the dimensions and moments of inertia of the mirror 1130 may be the same as those of the mirror 410. The piezoelectric actuators 1110, 1120 may in some cases provide an advantage over magnetic actuating components such as, e.g., the actuators 440, 450, in that ambient magnetic fields are less likely to cause uncommanded deflections of the mirror 410. Moreover, the piezoelectric actuators 1110, 1120 may be rigidly attached to the substrate 420 and the mirror 1130, so the frequency at which the mirror 1130 oscillates about an axis of rotation need not be at a resonant frequency of the mirror 1130 and spring 1150.

Figure 12A:
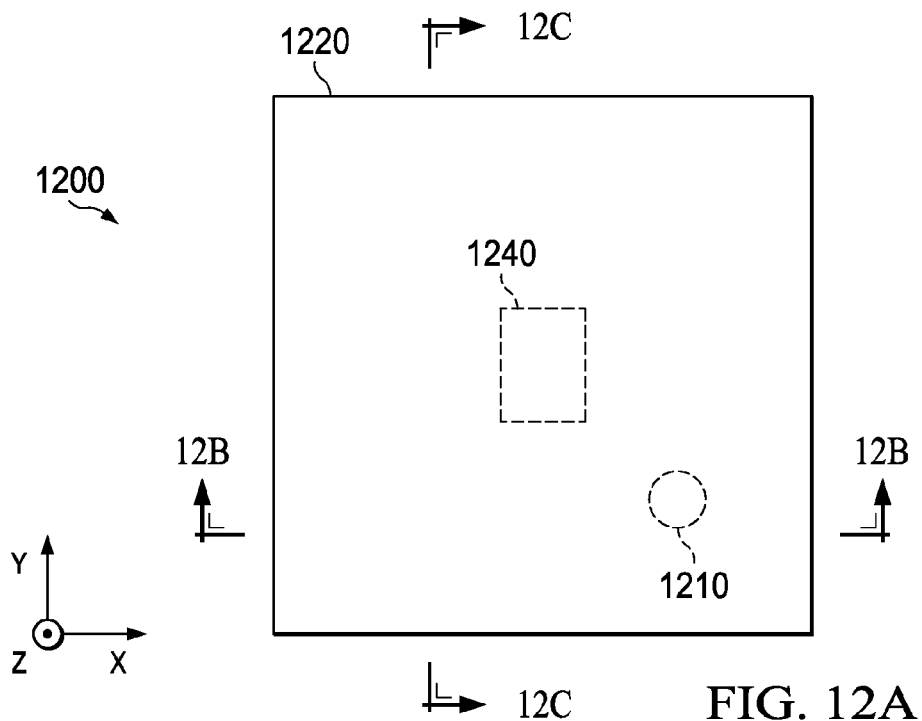
FIGS. 12A-12C illustrate an embodiment of a reflector usable, e.g. in the system of FIG. 1, using an actuator located at a position offset from axes of rotation.
Figure 12B:
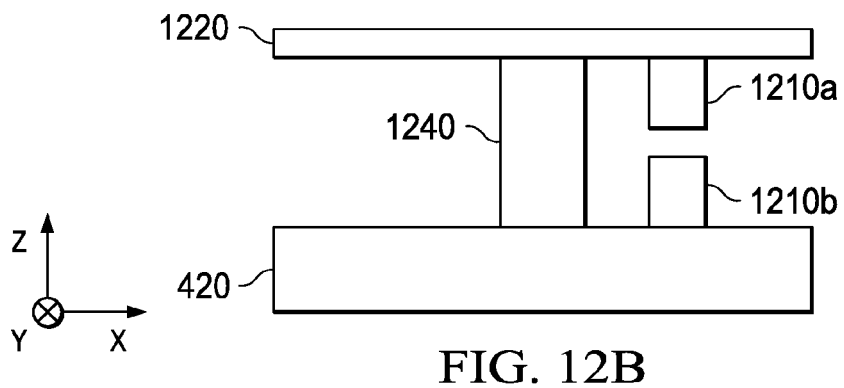
Figure 12C:
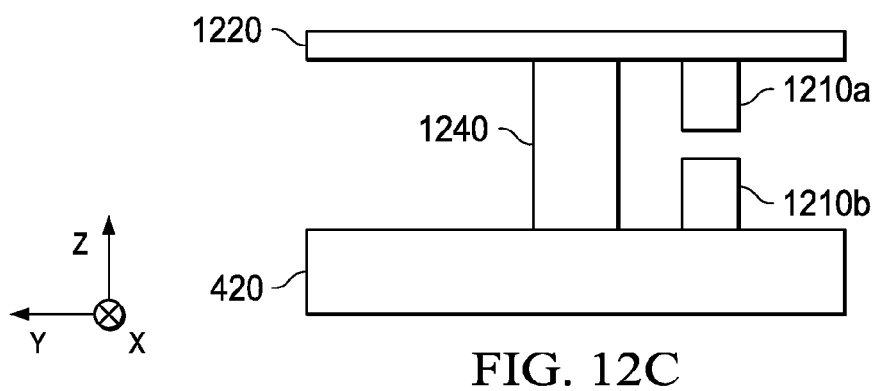

Turning now to FIG. 12, illustrated is an embodiment of a reflector generally denoted 1200 that includes an actuator 1210 configured to excite two eigenfrequencies of a mirror 1220. The actuator 1210 may be any actuator within the scope of the disclosure, and is shown without limitation as including actuator components 1210$a$, 1210$b$. The planar, convex, or concave mirror 1220 is attached to the substrate 420 by a spring 1240. The mirror 1220 and the spring 1240 are illustrated without limitation as having a square and rectangular cross-section, respectively. Thus, the mirror 1220 may have an eigenfrequency associated with resonant rotational oscillations about the x axis greater than an eigenfrequency associated with resonant rotational oscillations about the y axis.

The actuator 1210 is located at a position displaced from the x and y axes of the planar, convex, or concave mirror 1220. In the illustrated embodiment, the actuator 1210 is placed on the diagonal of the square mirror 1220, but need not be. Similarly to the embodiment of FIG. 7C, a control signal is provided to the actuator 1210 by a controller (not shown) configured to cause the actuator to simultaneously drive the mirror 1220 at both of its eigenfrequencies. The control signal may include, e.g., frequency components corresponding to each eigenfrequency to be excited. The configuration of the reflector 1200 advantageously reduces component count relative to embodiments using separate actuators to excite the various rotational vibrational modes of the mirror.

Figure 13A:
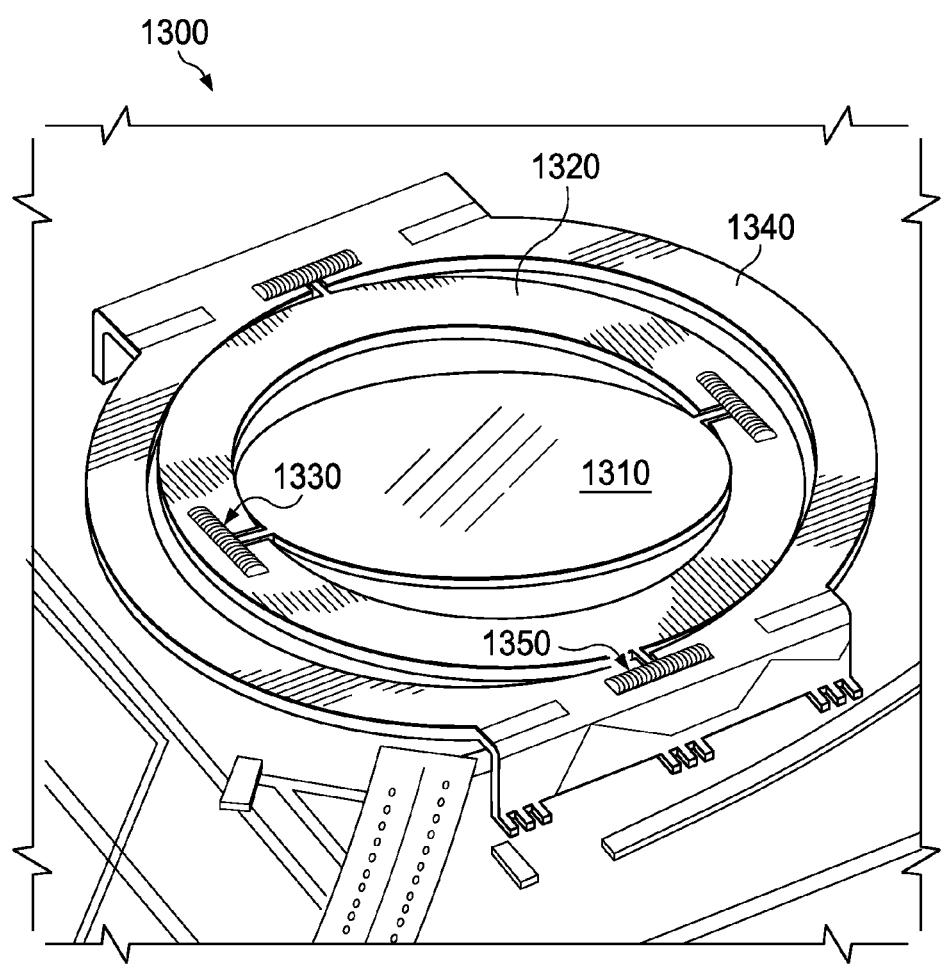
FIGS. 13A and 13B illustrate an embodiment of a reflector usable, e.g. in the system of FIG. 1 (FIG. 13A), and an array of such reflectors (FIG. 13B).
Figure 13B:
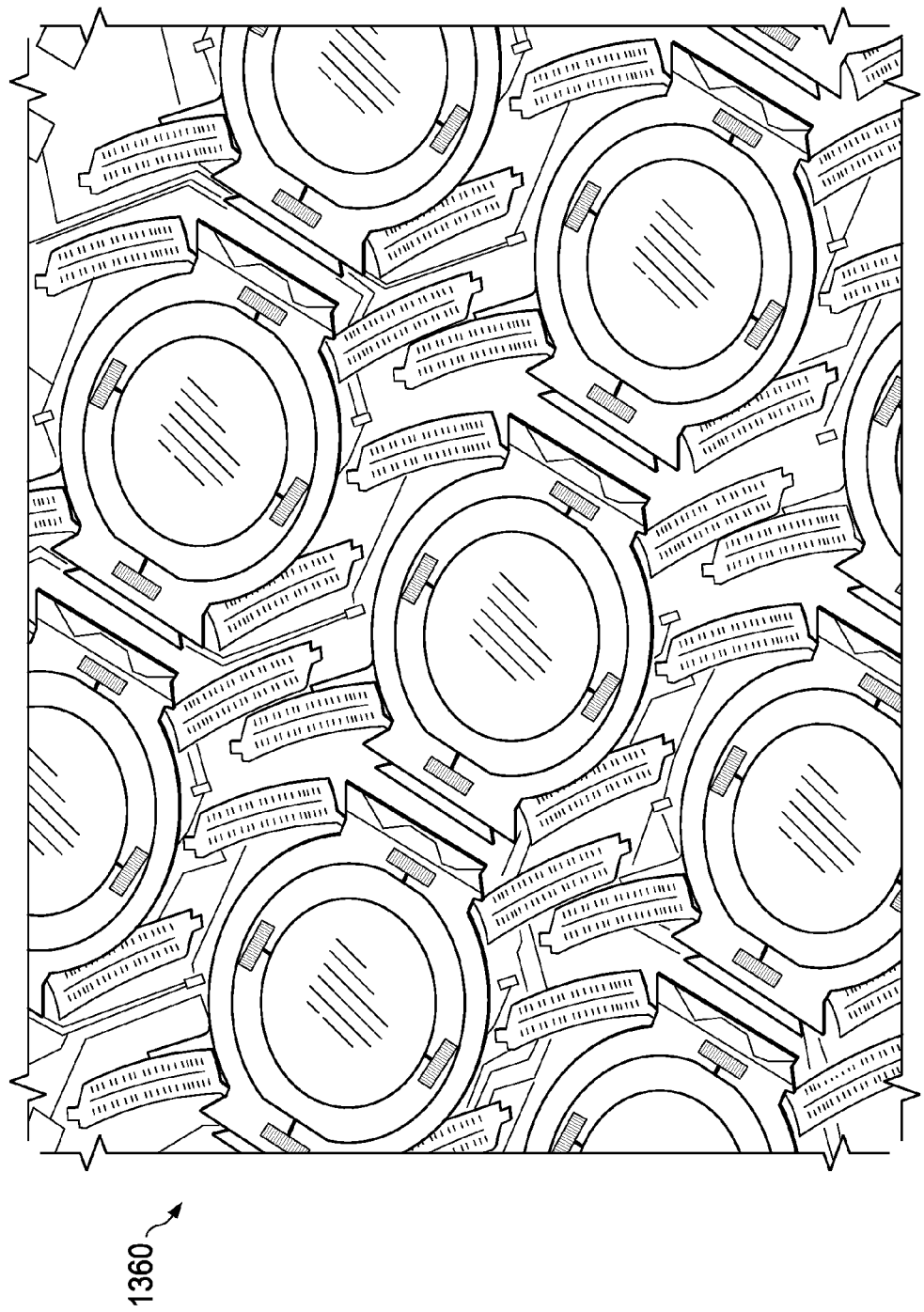

Turning finally FIGS. 13A and 13B, illustrated is an embodiment of a MEMS mirror 1300, i.e., a planar, convex, or concave mirror. The MEMS mirror 1300 is configurable to redirect an incident light beam in two axes. Those skilled in the pertinent art understand that MEMS refers to micro-electrical-mechanical systems, typically including components with feature sizes on the order of microns or millimeters. Nonlimiting examples of such MEMS mirrors are the MEMS mirrors in the Wavestar™ Lambda router, manufactured by Alcatel-Lucent USA, Inc., Murray Hill, N.J., USA. Fabrication of a similar mirror assembly on a silicon-on-insulator (SOI) substrate is described, e.g., in Dennis Greywall, et al., "Crystalline Silicon Tilting Mirrors for Optical Cross-Connect Switches," Journal of Microelectromechanical Systems, Vol. 12, NO. 5, IEEE October 2003, which is incorporated by reference herein in it entirety.

In the illustrated embodiment, FIG. 13A, a planar, convex, or concave mirror 1310 is attached to a gimbal 1320 via torsion springs 1330, and the gimbal 1320 is attached to a ring 1340 via torsion springs 1350. The mirror 1310, gimbal 1320 and the ring 1340 are attached to an underlying substrate. The mirror 1310 is free to rotate with respect to a first axis within the gimbal 1320, and the gimbal 1320 is free to rotate with respect to a second different axis within the ring 1340.

The MEMS mirror 1300 is controllable to be tilted around the first axis independently of its tilt about the second axis. Thus, an incident light beam may be reflected by the MEMS mirror 1300 arbitrarily within a cone defined by the tilt limits of the mirror 1310. A controller (not shown) may be configured to produce a desired temporal deflection pattern determined to reduce the effect of speckling on the image created by the output light beam 160 from the mirror 1300. In some embodiments, the mirror 1310 is driven to perform oscillatory tilts about the first axis at a first frequency $\omega$ and to perform oscillatory tilts about the second axis at a second different frequency $\omega_\phi$. The frequencies are chosen such that the magnitude of the difference $\omega_\phi$-$\omega_\theta$ is greater than the flicker fusion threshold, or greater than about 16 s$^{-1}$. Generally, the mirror 1310 is not operated at a resonant frequency, as the motion tends to be highly damped by, e.g., air resistance. In some embodiments, therefore, the MEMS mirror 1300 is configured to operate with independent control of the two axes of rotation, as described with respect to the reflector 400. The mirror 1310 may be configured to move with a periodic rotational displacement with a pattern designed to provide effective suppression of visual artifacts in a projected image. In some embodiments, the pattern is a pseudo-random pattern or a quasi-Lissajous pattern designed to reduce spatial correlation below the threshold of human perception.

FIG. 13B illustrates an array 1360 of MEMS mirrors each being configured as described above. In some embodiments, the MEMS mirrors are simultaneously controlled to deflect an incident light beam in the same direction. However, operation of the array 1360 is not limited to such coupled motion. For example, the MEMS mirrors 1300 may be controlled independently of each other when such control is determined to reduce perception of speckling. In some embodiments, it may be desirable to operate the MEMS mirrors 1300 with different rotational oscillations where such operation advantageously reduces speckle perception.

Those skilled in the art to which this application relates will appreciate that other and further additions, deletions, substitutions and modifications may be made to the described embodiments.

What is claimed is:

1. An apparatus comprising:
   a substrate;
   an electro-mechanical driver;
   a spring;
   a mirror being attached to said substrate via said spring, said driver being operable to cause said mirror to rotationally oscillate about first and second non-collinear axes at different respective first and second frequencies;
   a spatial light modulator having a plurality of separately controllable pixels; and
   wherein said mirror is configured to direct a diffused illumination beam from a coherent optical source toward said spatial light modulator such that said illumination beam simultaneously illuminates the pixels of a two-dimensional array while sweeping a path over said spatial light modulator.

2. The apparatus as recited in claim 1, wherein the mirror has a first resonant oscillation frequency for rotations about said first axis and has a different second resonant oscillation frequency for rotations about said second axis.

3. The apparatus as recited in claim 1, wherein said driver comprises an electromagnet.

4. The apparatus as recited in claim 1, wherein said driver comprises a piezoelectric element.

5. The apparatus as recited in claim 1, further comprising:
   an alternating voltage source; and
   wherein said source is connected across a capacitor in said driver.

6. The apparatus as recited in claim 1, wherein a difference between said first and second frequencies has a magnitude of more than about 16 s$^{-1}$.

7. The apparatus as recited in claim 1, further comprising one or more alternating current sources connected to cause said driver to simultaneously rotationally oscillate the mirror at the first and second frequencies.

8. The apparatus as recited in claim 1, wherein the mirror is a MEMS mirror operable to tilt about two axes.

9. The apparatus as recited in claim 1, wherein said driver is configured to cause the mirror to rotationally oscillate at first and second mechanical resonant frequencies thereof.

10. The apparatus as recited in claim 1, further comprising said coherent optical source.

11. The apparatus as recited in claim 1, further comprising an electromechanical driver configured to oscillate said mirror.

12. The apparatus as recited in claim 1, wherein said path is a Lissajous figure.

13. The apparatus as recited in claim 1, wherein a Poynting vector of said light beam sweeps over an area of said spatial light modulator that has a side length no greater than about 40 pixels of said spatial light modulator.

14. The apparatus as recited in claim 1, wherein said spatial light modulator includes a MEMS micromirror array.

15. The apparatus as recited in claim 1, wherein said spatial light modulator includes a planar array of liquid-crystals-on-silicon (LCOS).

16. The apparatus as recited in claim 1, wherein said mirror has a nonplanar reflective surface.

17. The apparatus as recited in claim 1, wherein said mirror is configured to oscillate in each of said axes at a frequency in a range within about 100 Hz to about 1 kHz.

18. The apparatus as recited in claim 1, wherein said second frequency is a noninteger multiple of said first frequency.

19. The apparatus as recited in claim 1, wherein a maximum angular displacement of said mirror about said first and second axes is about 1°.

20. The apparatus as recited in claim 10, wherein said coherent optical source, said mirror and said spatial light modulator are configured to produce multiple uncorrelated speckle patterns in a projected image.

* * * * *